April 18, 1939. W. KARSCH 2,155,134
FERMENTATION PROCESS
Filed May 19, 1937
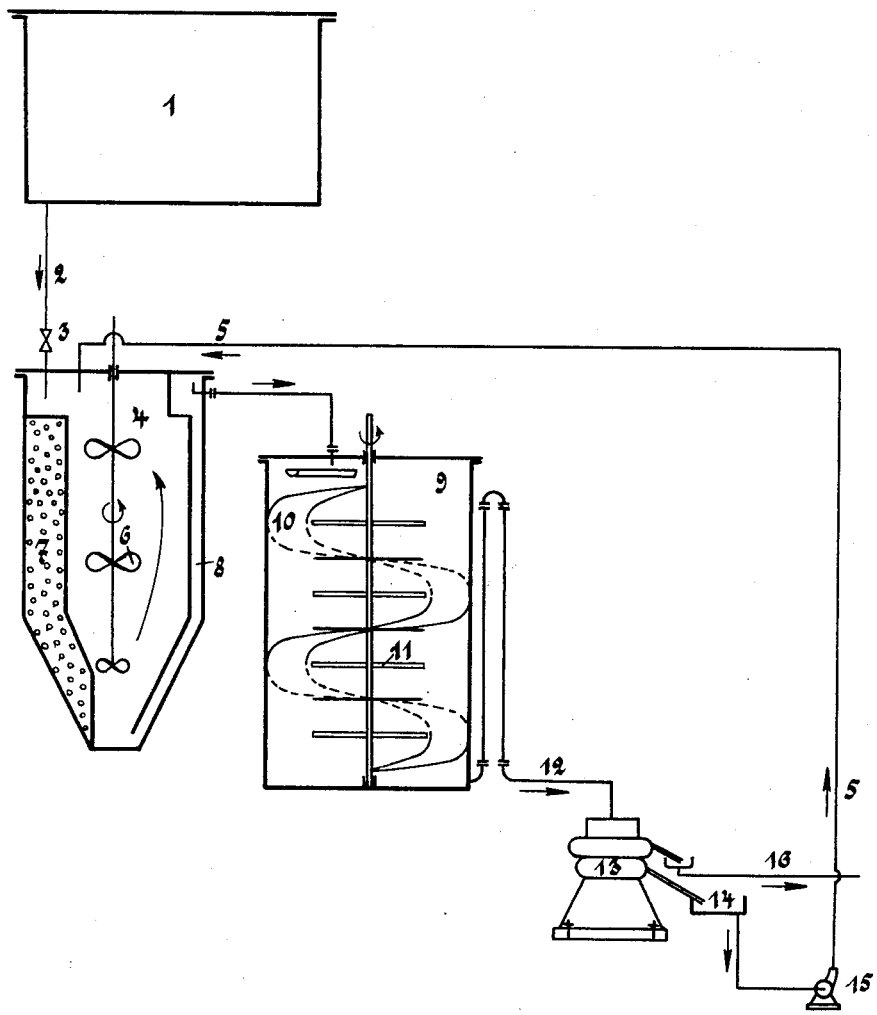
Inventor:
Walter Karsch,
Attorneys Patented Apr. 18, 1939

2,155,134

UNITED STATES PATENT OFFICE 2,155,134

FERMENTATION PROCESS

Walter Karsch, Tornesch, Germany, assignor to Deutsches Reich, Reichsmonopolverwaltung für Branntwein, Berlin, Germany Application May 19, 1937, Serial No. 143,611
In Germany December 5, 1935

5 Claims. (Cl. 195—37)

This invention relates to a fermentation process for the production of alcohol from liquids containing carbo-hydrates.

For the production of alcohol by fermentation by the action of yeast on carbo-hydrates there have been hitherto used continuous and discontinuous fermentation processes. It is commonly known that continuous processes are preferred to discontinuous processes on account of the higher economy due to lower installation and maintenance costs. The continuous processes heretofore employed, especially the fixed fermentation process, are, however, associated with drawbacks which detract substantially from the economy. In the fixed fermentation process losses are experienced for the reason that the liquid does not run uniformly through the yeast carrier, but in certain zones attains a higher speed where less resistance is to be overcome. As a result carbo-hydrates are lost by not being converted. A further drawback is the rapid contamination of the yeast carrier with suspended particles and dead yeast cells, whereby the output or efficiency of the fermentation vats falls rapidly. A disadvantageous effect dependent thereon is the occurrence of infections, as the dead yeast cells form an excellent culture ground for bacteria. On the other hand, effective measures for sterilization cannot be taken without destroying the yeast, so that losses by secondary fermentations are unavoidable.

The discontinuous fermentation processes suffer from the drawback that a substantial fermentation space and considerable outlay for service are required. They also suffer from the drawback that the yeast is longer in contact with the conversion products than is actually necessary. Thereby the yeast is damaged, occasioning the death of cells. Yeast can only be used for a certain time for repeated fermentation, it being then necessary to introduce a fresh supply of yeast from storage. The yeast counteracts, it is true, the greater mortality by increased building of cells, but necessarily connected therewith there is a loss in carbohydrates for the alcohol formation.

This drawback is also experienced with a known discontinuous fermentation process in which the operation is effected with large quantities of yeast, and after completion of the individual fermenting operations the fermented liquor is separated into a part poor in yeast and a part rich in yeast, and the part rich in yeast is used again for subsequent fermentation. By the large quantities of yeast added a certain acceleration of the process is intended to be obtained. As the liquor to be fermented is not moved during the fermentation operation, the yeast cells settle and remain a long time in contact with the conversion products. The part rich in yeast which is separated after completion of each fermentation step remains several hours in contact with nocuous substances, resulting in further losses in yeast.

The drawback of diminished output of alcohol in consequence of the utilization of a part of the sugar present in the wort for the formation of yeast is also experienced in another known continuous process in which a part of the wort which is run off is returned to the inlet for the wort, so that a part of the yeast is in continuous circulation within the first part of the current of wort. For this process it has also been proposed to divide that part of the wort current which is branched off into a part rich in yeast which is returned to the inlet for the wort and a part poor in yeast which is returned to the liquor that is being or has been fermented. Associated with this method is the drawback that a substantial part of the yeast is wholly removed from the fermentation system along with the fermented liquor. Only the small quantity of yeast which is contained in the part of the wort which has been branched off is again returned to the fermentation system. Therefore a substantial part of the sugar of the wort must be utilized for the formation of yeast, whereby the output of alcohol is diminished.

In contrast with these known processes the subject of the invention consists in a continuous process in which provision is made for continuous movement of the yeast cells and of the liquor to be fermented relatively to one another.

The invention provides that the total quantity of yeast shall be led positively and continuously in a circuit through a fermentation system consisting of a mixing device and a separating device in this wise that the total quantity of yeast is moved unidirectionally from the mixing device to the separating device and back to the mixing device. Preferably, after a predetermined controllable time, each yeast particle passes through the separating device and thus comes in contact with fresh particles of sugar. The yeast is thus for a short time only free from the material to be fermented. The fermented liquor, after a predetermined controllable time, and after once traversing the fermentation system, leaves the said system beyond the separating device. It has been found that yeast can operate continuously in this process because it is removed as rapidly as possible from the conversion products formed. The loss of yeast cells observed with discontinuous fermentation practically does not occur in the present process. The mixing of the yeast and of the liquor to be fermented is as intimate as possible, so that the conversion of the sugar to alcohol and to carbonic acid is effected with the greatest rapidity. At the exchange surface—the yeast membranes—by the intimate admixture the conversion products formed are withdrawn and new sugar molecules added.

By the flow through the fermentation system in the direction from the mixing device to the separating device it is further ensured that each yeast particle is separated positively after a predetermined time from the conversion products and is mixed with fresh sugar particles. No yeast particles can move in the fermentation system otherwise than in the desired direction, or settle, which is of great importance for the attainment of a maximum output of alcohol. Likewise the fermented liquor is led positively to the separating device, so that the result is obtained that the nocuous conversion products formed are separated as soon as possible from the yeast.

In the preferred embodiment the liquor is subjected to an after-fermentation in the interval between the mixing of the yeast with the liquor to be fermented and the separation of the yeast from the fermented liquor.

The process according to the invention can be performed with any suitable apparatus. The invention also comprises preferred embodiment of apparatus for performance of the process.

One example of construction of apparatus according to the invention is illustrated diagrammatically in the accompanying drawing.

In a storage tank 1 there is contained a liquid containing carbo-hydrate, for example, a solution of molasses, which is run from said tank by a pipe 2 fitted with a valve 3 into a mixing vessel 4. In the mixing vessel there is effected intimate admixture with the yeast which enters by way of a pipe 5, mixing being effected by means of a stirring device 6 comprising stirrers carried by a vertical shaft. Impact plates 7 fitted within the vessel promote the mixing operation. From a channel 8 into which the wort enters from below the liquor is drawn off at the top, away from the mixing device and led to a container 9 which is equipped with helically disposed guide-plates 10 which effect positive movement of the liquid in one direction. The plates may be either so arranged that the liquid flows from above downwardly or that it flows in the opposite direction from below upwardly. During its flow the fluid is acted upon by horizontally acting stirring blades 11. The material is discharged from the container 9 by way of a pipe 12 into a separator 13 in which de-mixing is effected. The separated yeast runs into a yeast container 14 and is fed by a pump 15 by way of the pipe 5 to the point of admission to the mixing device 4. The fermented alcoholic liquor runs through a pipe 16 to a distilling apparatus not shown.

In the container 9 (or like device, for example a tube provided with resistances or a column provided with chambers or floors) after-fermentation is effected by fermenting the residue of unfermented sugar. The speed of flow of the liquor is preferably so controlled that on discharge from the container 9 complete or final fermentation is effected.

The yeast may be removed from the fermented liquor not only by separation but also by filtration, for example with the use of a rotatable deposition filter. The yeast is out of contact with carbo-hydrates only in a part of the circuit travelled thereby, namely from its entry into the separating device up to its entrance into the mixing device. This lasts for only a short time, so that the yeast is practically continuously operative and a minimum fermentation space is occupied.

The yeast discharged from the separator may be treated with disinfectants for the purpose of removing any undesired micro-organisms.

*Example.*—The molasses solution in the tank 1 contains 10% by weight of cane sugar. The speed of flow of the sugar solution through the fermenting device is so controlled that the entering liquor traverses the device within 30 minutes. For the conversion of 1000 cubic meters of 10% molasses solution daily there is thus necessary a fermentation space of 21 cubic meters. The alcohol content of the liquor which is run off amounts to 5.16% by weight, that is 96% of the quantity to be expected according to the fermentation equation. A higher yield is not obtainable as secondary fermentations, for example glycerine formation, are experienced in every fermentation process.

According to the invention there can be fermented different types of solutions containing fermentable sugar. The speed of conversion is dependent on the nature of the material to be fermented but is higher than with the fermentation processes heretofore employed.

For the details of construction described and illustrated there may be substituted other equivalent devices.

I claim:—

1. A continuous fermentation process for the production of alcohol from liquids containing fermentable sugar comprising, continuously supplying wort liquor to a fermentation system, mixing yeast with the wort liquor, moving the liquor and yeast continuously through said system with continuous unidirectional flow of the entire quantity of the yeast, separating the entire quantity of the yeast contained in the resulting fermented liquor at the end of said system, continuously discharging the separated fermented liquor and returning the entire quantity of the separated yeast to the beginning of the system where it is continuously mixed in with the wort liquor continuously supplied to the system.

2. A process according to claim 1, in which said yeast is separated after completion of the fermentation and said separated yeast is immediately mixed with fresh fermentable sugar particles.

3. A process according to claim 1, in which the separated fermented liquor is discharged after transversing the fermentation system once and after completion of the fermentation.

4. A process according to claim 1, comprising in addition subjecting the mixture of yeast and wort liquor to after-fermentation before the resulting fermented liquor is separated from the yeast.

5. A process according to claim 1, in which the yeast which is mixed with the wort liquor is prevented from settling during the fermentation.

WALTER KARSCH.